United States Patent [19]
Paul

[11] Patent Number: 5,640,222
[45] Date of Patent: Jun. 17, 1997

[54] METHOD AND APPARATUS FOR PRODUCING STEREOSCOPIC IMAGES

[76] Inventor: Eddie Paul, 414 W. Walnut Ave., El Segundo, Calif. 90245

[21] Appl. No.: 617,478

[22] Filed: Mar. 15, 1996

[51] Int. Cl.[6] .......................... G03B 35/08; G03B 35/02; H04N 13/00; H04N 13/02
[52] U.S. Cl. ............................. 352/60; 352/65; 348/42; 348/50
[58] Field of Search ............................. 352/57, 60, 65; 348/42, 50

[56] References Cited

U.S. PATENT DOCUMENTS

1,282,073  10/1918  Hahn ........................................ 352/65
1,602,251  10/1926  Quidor et al. ............................ 352/65

Primary Examiner—Safet Metjahic
Assistant Examiner—Daniel Chapik
Attorney, Agent, or Firm—John E. Vanderburgh

[57] ABSTRACT

The lens body of a camera for sensing moving images is adapted for producing a stereoscopic image by first and second spaced apart optical deflectors. The deflectors include reflective surfaces which lie in parallel planes with respect to one another and which are disposed at an angle to the optical path of incoming image rays. The second deflector lies generally in the optical path of the incoming image rays and deflects incoming image rays from the scene to the first deflector which lies in the path of the deflected rays. The first deflector in turn deflects the image rays to the image sensing means in the camera body. Both deflectors are caused to rotate slowly about an axis defined by the optical path of the incoming image rays while maintaining their relative positions with respect to one another. The orientation of the lens with respect to the image sensing means of the camera remains fixed during rotation of the deflectors. In one embodiment the optical deflectors are positioned in front of the lens exteriorly of the lens body. In another embodiment the optical deflectors are positioned in the lens body of the camera behind the lens and the lens body is adapted for rotation while the lens does not rotate.

8 Claims, 5 Drawing Sheets

METHOD AND APPARATUS FOR PRODUCING STEREOSCOPIC IMAGES

FIELD OF THE INVENTION

This invention relates to the production and display of video and motion pictures and more particularly to an improved lens system for producing 3D images in video and film media.

BACKGROUND OF THE INVENTION

Various imaging systems have been developed in the art to produce stereoscopic or 3D images. These systems generally consist of a method for creating two images as seen from a different perspective and means for displaying the images so that one eye sees one perspective of the image and the other eye sees a different perspective of the image to produce a 3D image.

One method is based on the use of separate spaced apart optical means to produce two perspectives of the same image. The images are displayed side by side, such as on film or on a cathode ray tube (CRT). Means are provided so that the left eye sees only one image and the right eye sees only the other image so that the image as processed by the brain appears as a stereoscopic image.

One example of such a system is found in U.S. Pat. No. 3,784,738 issued Jan. 8, 1974 to Howard Natter for producing stereoscopic video. Natter employs an image displacer which creates two images as viewed from different perspectives. As an alternative Natter can employ two spaced apart video cameras to create two images of the scene. These images are broadcast to receiving station which transmits the images to a CRT where they are displayed side by side. If two cameras are used the images are displayed on separate CRT. The CRT is mounted in headgear having spaced apart viewing windows so that only one eye can view one image. This system relies heavily on the fact that the two images must be shot and kept perfectly synchronized, or the image will deteriorate.

Similarly, U.S. Pat. No. 4,303,316 issued Dec. 1, 1981 to Robert McElveen discloses a two camera system for recording left and right perspectives of a scene. The images are then combined on a film strip in a sequence of left and right views with non-moving parts of the scene super imposed. In this manner stereoscopic projections on a two dimensional surface can be seen with unaided eyes. As an alternative a single camera having a shutter that alternately record left and right perspectives of a scene can be used.

Other systems employing several cameras or optical means for creating left and right image perspectives which are the displayed alternatively to create a stereoscopic effect are disclosed in U.S. Pat. No. 3,251,933 issued May 17, 1966 to H. E. Beste; U.S. Pat. No. 4,523,226 issued Jun. 11, 1985 to Lipton et al.; U.S. Pat. No. 5,142,642 issued Aug. 25, 1992 to H. Sudo; and U.S. Pat. No. 4,751,570 issued Jun. 14, 1988.

Another method involves moving the camera and image with respect to one another to produce stereoscopically related images. These images can be displayed sequentially to provide a stereoscopic image without the aid of a viewing device. Alternatively, a viewing device or apparatus can be used which in effect causes the left eye to see a left perspective and the right eye to see a right perspective of the image. These systems allow for the use of a single sensor.

In U.S. Pat. No. 4,807,024 issued Feb. 21, 1989 to McLaurin et al. a single camera is disposed on a moving platform and the stereoscopically related images are presented alternately so that the resulting image is perceived as having depth. No special viewing device or glasses is required.

U.S. Pat. No. 4,754,327 issued Jun. 28, 1988 to Thomas Lippert also employs a single sensor on a horizontally moving platform for producing left and right perspectives of an image as the sensor moves. The images may be displayed as separate frames for the left and right eye to provide depth to the image. The images may be separated by differences in polarity of light or sequentially to the left and right eye.

U.S. Pat. No. 4,943,852 issued Jul. 24, 1990 to Fermano et al. discloses a converter for attachment to a conventional video camera which has shutter means for alternately presenting to the video camera left and right side perspectives of the image being recorded. A viewer included voltage activated light valves to alternately present to the view the left and right side perspectives of the image to create a 3D effect.

U.S. Pat. No. 4,723,159 issued Feb. 2, 1988 to Donald Imsand combines a reference camera and a moving dynamic camera to produce stereoscopic images. As an alternative to moving the dynamic camera, Ismand can use rotating mirrors to create the effect of moving the dynamic camera. Ismand teaches the repositioning of objects close to the dynamic camera, which appear to move due to the movement of the camera or mirrors, to positions as recorded by the reference camera. This technique is referred to as "global convergence".

While the systems described in the foregoing patents may effectively provide stereoscopic images, it will be apparent that they require additional equipment such as extra cameras and processing equipment or awkward moving platforms.

U.S. Pat. No. 5,151,821 issued Sep. 29, 1992 to Mortimer Marks uses the horizontal movement of a pair of mirrors arranged at an angle to deflect the image into the lens of a single camera or sensor to create left and right images of different perspectives as the mirrors travel. These images may then be viewed as a stereoscopic or 3D image through photopic scotopic filters. The images appear as conventional two dimensional images when viewed without the filters. Although cutting down on the extra equipment required with some 3D systems, the Marks system produces dead spots, that is frames which are not in 3D at the point where the travel of the mirrors is reversed. These dead spots are noticeable when viewing a motion picture or video shot using the Marks system. In addition the equipment used to mount the moving mirrors is bulky and awkward to operate, especially at sporting events and other live TV presentations. It also has difficulty in focusing in the telephoto range.

To simplify the production of 3D images, devices have been proposed for attachment to the lens of a conventional camera or to replace the conventional lens of a camera. Thus, U.S. Pat. No. 4,295,153 issued Oct. 13, 1981 to Stephen Gibson describes a device for producing stereoscopic images which is designed to attach to a conventional camera body, motion, video or still, in place of the normal lens. The device includes first and second spaced apart lenses for obtaining left and perspectives of the image. Light rays from the first and second lenses travel essentially equal distance to the recording device to produce superimposed stereoscopic images of equal size. The image is viewed in 3D through glasses which permit the left perspective to be viewed through the left eye and the right perspective through the right eye. U.S. Pat. No. 4,568,970 issued Feb. 4, 1986 to Walter Rockstead is a device which is adapted to be placed in front of the lens of a video camera to produce side-by-side left and right rectangular images. The same device can be used by the viewer to view the side-by-side images in which case the device is adjusted to deliver the left and right images to the viewers left and right eyes respectively to produce a stereoscopic effect. These systems require special viewing devices in order to view the side-by-side images or adjustment must be made to the lens device, in the case Gibson, in order to view the conventional 2D image. Once this adjustment is made the scene is recorded in conventional 2D.

Accordingly it would be desirable to have a device which is readily fitted on the body of a conventional motion picture camera or video camera which will allow the recording of a scene stereoscopically but which, at the same time, also improves the quality of the projected scene when viewed by the unaided eye.

SUMMARY OF THE INVENTION

The present invention relates to a novel and unique method and apparatus for conventional motion picture and video camera bodies which eliminates the necessity of more than a single sensor to record stereoscopic images and which eliminates the awkward and bulky ancillary equipment normally associated with the filming or recording of images stereoscopically. The stereoscopic image if viewed with glasses has a 3D or layered effect appearing as if some objects are in front or behind others, it has also been unexpectedly found that the quality of the image, when viewed as a 2D image, without glasses, is improved and approaches the look and quality of film.

As discussed above U.S. Pat. No. 4,807,024 (McLaurin et al.) and U.S. Pat. No. 4,754,327 (Thomas Lippert) and U.S. Pat. No. 5,151,821 (Marks), it is known that by moving an object in relation to a camera the resulting image, when properly viewed, can be perceived as having dimension even though viewed on a flat screen. Marks discusses the "Pulfrich Effect" which involves the use of photopic-scotopic filters to create a stereoscopic effect when viewing an image recorded with a continuously panning camera. Although it is not fully understood, the apparatus of the present invention allows for the recording of an image which, when viewed through a photopic-scotopic device appears as a stereoscopic image. Moreover, as mentioned above, when viewed without such a device the quality of the image is unexpectedly improved.

The apparatus disclosed herein includes a camera body, a lens body on the camera body carrying one or more lenses, image sensing means, such as film or tape for recording a scene. Also, image sensing means may consist of the necessary circuitry for transmitting the images rather than recording at the camera with no modification of the existing production or post-production equipment now used being required.

In accordance with the invention the lens body is adapted for producing a stereoscopic image by first and second spaced apart optical deflectors. In one embodiment the deflectors include reflective surfaces which lie in parallel planes with respect to one another and which are disposed at an angle to the optical path of incoming image rays. The second deflector lies generally in the optical path of the incoming image rays and deflects incoming image rays from the scene to the first deflector which lies in the path of the deflected rays. The first deflector in turn deflects the image rays to the image sensing means in the camera body. Both deflectors are caused to rotate slowly about an axis defined by the optical path of the incoming image rays while maintaining their relative positions with respect to one another. The orientation of the lens with respect to the image sensing means of the camera remains fixed during rotation of the deflectors. Driving means for rotating the deflectors, such as, for example, an electric motor, is provided and can be powered directly from the circuitry of the camera or self powered. Good results are achieved with a wide variety of lens sizes. Thus the present invention can be used with cameras employing small lenses such as 35 mm up to large IMAX type cameras employing 70 mm film.

In this embodiment of the invention the deflectors are carried in front of a conventional lens by suitable support structure. Preferably the deflectors are mirrors having facing reflecting surfaces although prisms can be used with excellent results. The mirrors are first surface mirrors, that is the reflecting layer of the mirror is on the surface and is not covered by a glass or plastic protective layer since such materials refract light which would result in a distorted image. This embodiment of the invention is most particularly suited for "long lenses" that is lenses that have a relatively long focal length covering a field of view of about 70° or less. The so called wide angle lenses, that is lenses having a short focal length and which cover a field of 90° or more cannot be used with this embodiment of the invention.

In another embodiment of the invention the first and second deflectors are placed in the lens body behind the lens. The lens body is shaped so that the optical axis of the lens is offset from the sensing means. The first deflector is positioned in the optical axis of the lens to deflect the image rays to after passing through the lens to the second deflector which deflects light through another lens to the recording means. The two lenses are utilized to extend the reflected image the required distance required by the periscope shaped body. In this embodiment the periscope shaped body is rotated in the camera body while the lens is mounted for rotation about its optical axis to maintain the orientation of the lens fixed with respect to the camera regardless of the rotation of the lens body. With this embodiment, short focal length lenses can be used as well as the long focal length lenses.

The resulting images from either embodiment of the invention may be viewed in a conventional manner, that is with the unaided eye on a two dimensional viewing surface. To achieve a stereoscopic effect, it is necessary to view the images using photopic-scotopic filters such as special glasses in which such filters are mounted or by a photopic-scotopic raster sheet in front of a screen for viewing without glasses. Viewing devices based on the use of photopic-scotopic filters are well known in the art and do not per se form a part of the present invention.

The invention will be more fully understood from the following description of the preferred embodiments taken in conjunction with the drawings.

DESCRIPTION OF THE PREFERRED EMBODIMENTS

Referring to FIGS. 1–7 a video camera 10 of conventional design is illustrated. The video camera 10 comprises a camera body 12 defining a viewing end 14 having a opening 16 and an interior in which are contained the various components and circuitry for recording or transmitting a scene. The design and functioning of a video camera 10 is well known in the art and does not per se form a part of the present invention. A lens body 17, in which is mounted a lens 19, is disposed in the opening 16 of the viewing end 14 of the camera body 12. A power pack (not shown), which contains a power supply, such as a battery, may be mounted on the camera body 12 for supplying the power necessary for operation of the video camera 10. A viewer housing 18 is mounted on the upper surface of the camera body 12 for through-the-lens viewing of a scene by the camera operator. The video camera 10 may be connected by cables (not shown) to a central location for operation power and transmission or recording of a scene. However, the camera body 12 may contain means such as video tape for recording the scene for later playback.

Although the invention will be described herein in connection with a video camera, it should be understood that the invention and its function applies equally to motion picture cameras in which film is the recording medium and as used hereinafter the term "camera" should be understood to include both video and film cameras capable of recording and filming moving scenes.

Figure 1:
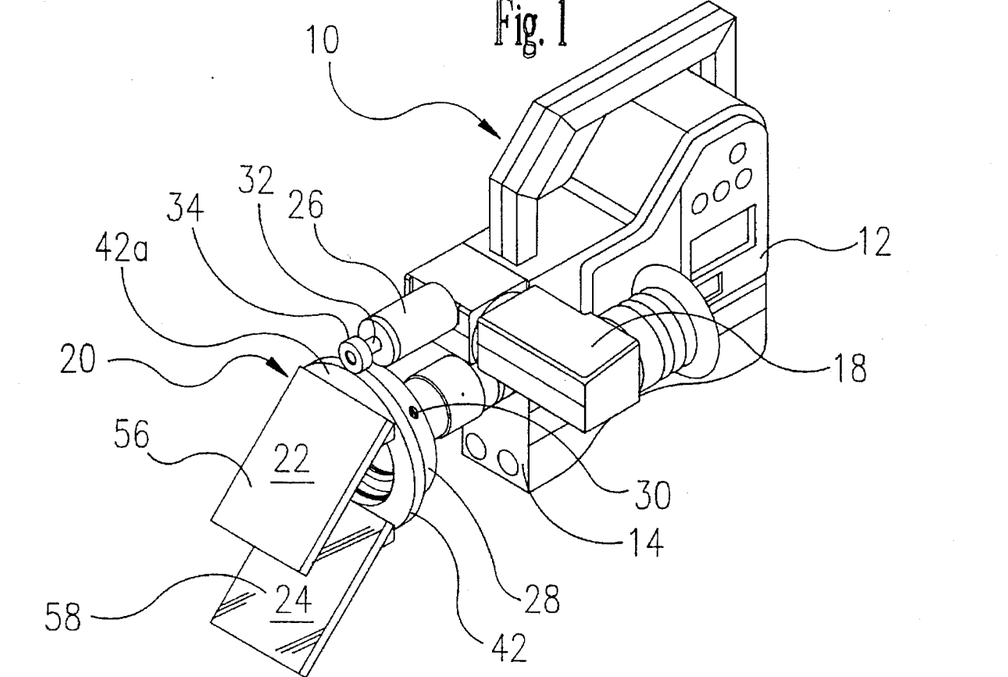
FIG. 1 is a perspective view of a video camera adapted for recording stereoscopic scenes in accordance with the invention.

In accordance with the invention, the camera 10 is adapted for recording images which can be viewed as stereoscopic or 3D images or enhanced quality 2D images by an attachment 20 for the lens body 17 comprising a first deflector 22 and a second deflector 24 both of which are disposed in front of the lens 19 and rotate about the optical path of the incoming image rays. The first deflector 22 is disposed at an angle to the optical path of the image rays and it extends over the lens 19 to screen the lens. The second deflector 24 is spaced apart from the first deflector 22 and lies in a plane parallel to the plane of the first deflector 22. Incoming light from the scene is deflected by the second deflector 24 to the first deflector 22 which deflects the light to the lens 19. Although it is not fully understood, it is believed that the rotating deflectors 22 and 24 continuously view varying perspectives of the scene. When viewed though photopic-scotopic filters the left and right eyes see different perspectives of the scene in accordance with the Pulfrich effect and the viewer perceives a single image as a stereoscopic or 3D image. Surprisingly, the images produced, when viewed normally, are of enhanced quality, particularly video which is enhanced to film quality possibly through a pixalation of the scanned image.

Figure 2:
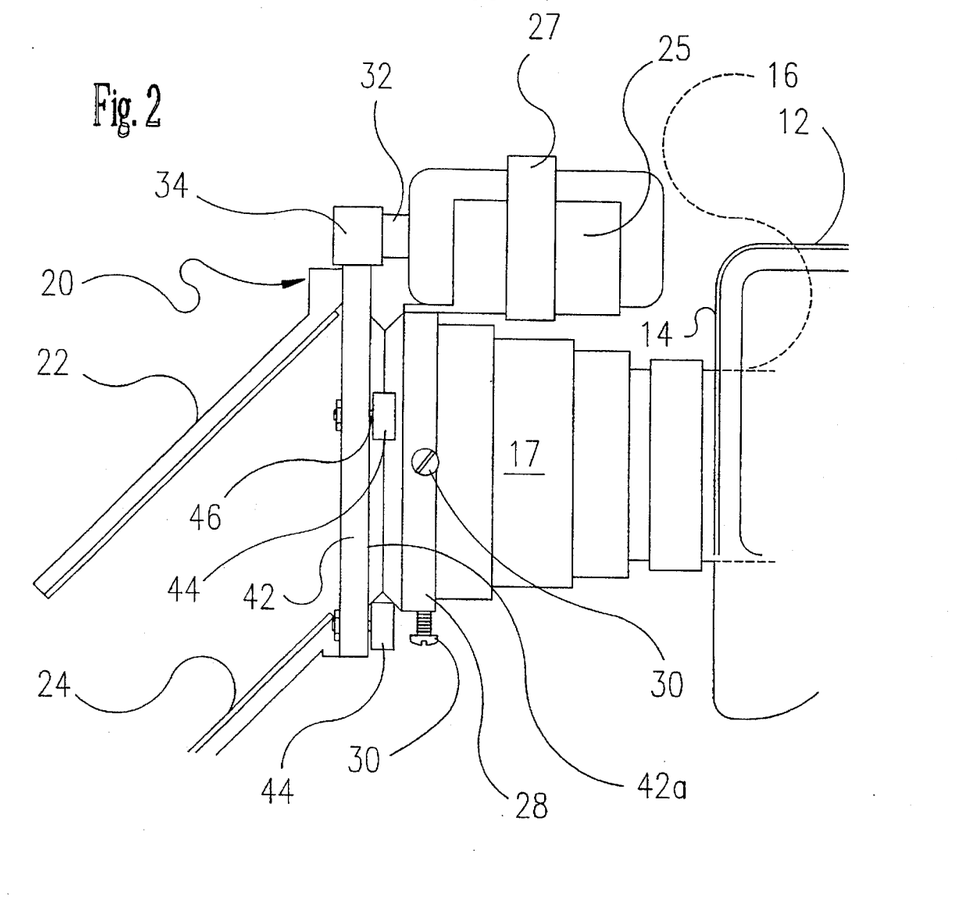
FIG. 2 is a side view, partially cut away for compactness of illustration, of the lens body and stereoscopic attachment of FIG. 1.
Figure 3:
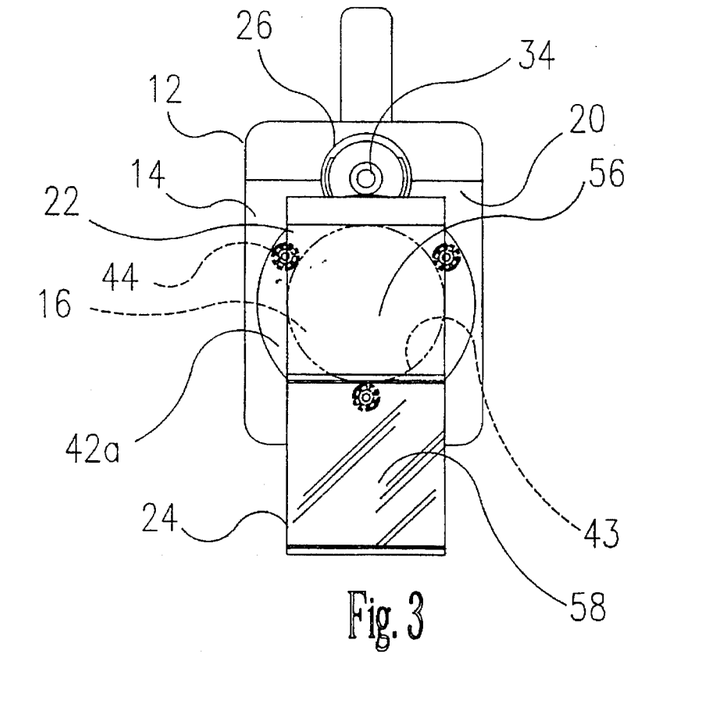
FIG. 3 is a front elevation of the camera of FIG.1.
Figure 4:
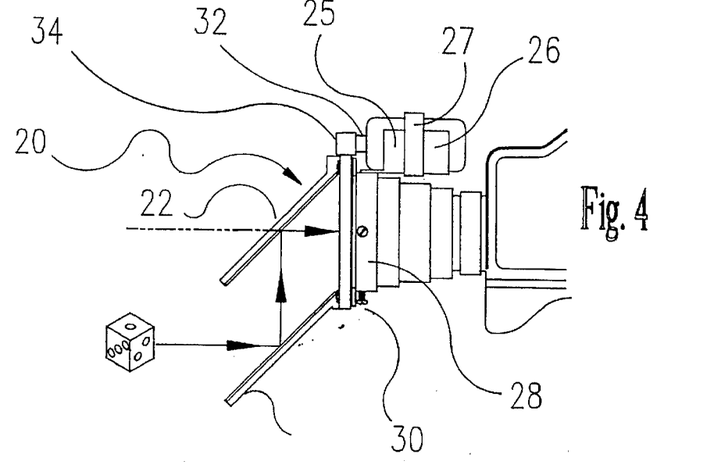
FIG. 4 is a ray trace diagrammatic illustration of the embodiment of the invention of FIG. 1 illustrating the manner in which the image ray is first received by the deflectors and deflected to the lens and showing the optical path of the incoming image rays.
Figure 6:
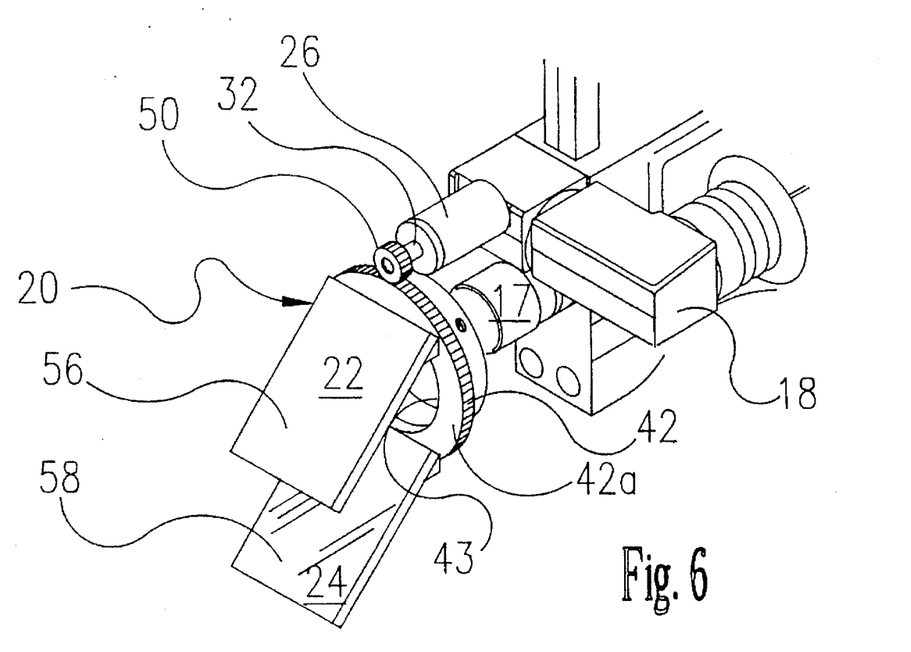
FIG. 6 is a perspective view showing another embodiment of the drive shown in FIG. 1.

In more detail, reference is made to FIGS. 2 and 3 in which an electric motor 26 is carried by a cradle 25 affixed to a mounting ring 28 that is mounted of the forward portion of the lens body 17. A strap 27 secures the motor 26 in the cradle 25 and the motor is in electrical contact with the power pack or other power source (not shown). The mounting ring 28 is removably secured on the lens body 17 by clamping screws 30 which are threadibly mounted in openings in the mounting ring 28. The motor 26 includes a drive shaft 32 on which is carried a drive wheel 34, or pulley and belt assembly (FIG. 7) or drive gear assembly (FIG. 6). An annular track 40 is defined about the forward end of the lens mount 28. A rotatable ring 42 having front surface 42a, a rear surface 42b and a center opening 43 is rotatably mounted on the mounting ring 28 by means of a set of guides 44, such as wheels or bearings, rotatably carried on shafts 46 extending from the rear surface 42b of the rotatable ring 42 and which travel in the annular track 40. The drive wheel 34 contacts the peripheral surface of the rotatable ring 42 to cause the ring to rotate about the optical path of the image rays responsive to the rotation of the drive wheel 34 as driven by the motor 26. The peripheral surfaces of the drive wheel 34 and the rotatable ring 42 may be formed of a material having a high coefficient of friction, such as a soft rubber, to ensure that there is no slippage between the drive wheel 34 and the rotatable ring.

Figure 7:
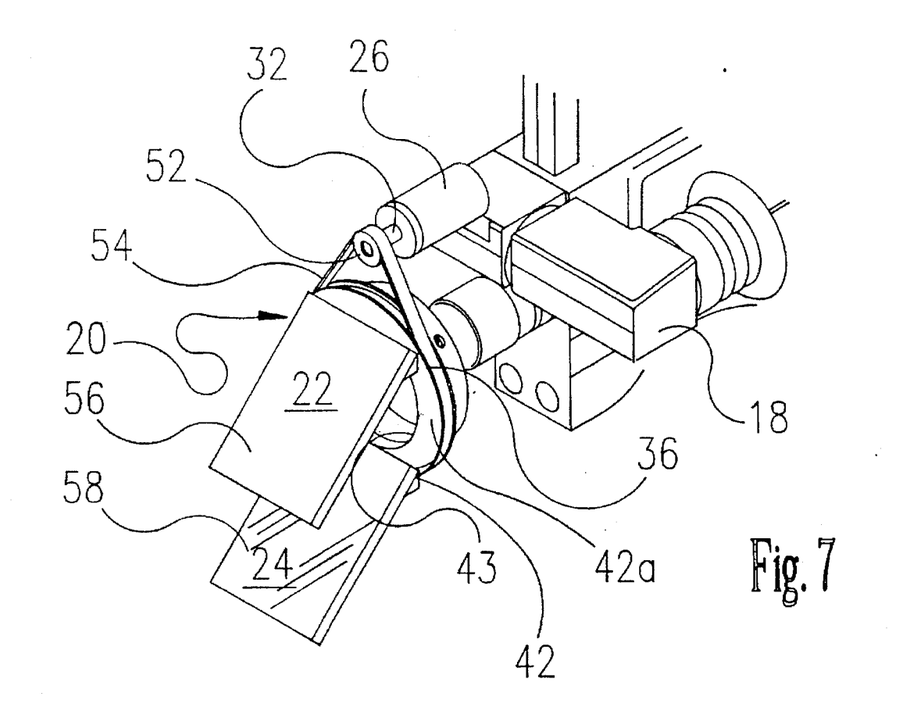
FIG. 7 is a perspective view showing yet another embodiment of the drive shown in FIG. 1.

Referring to FIGS. 6 and 7 alternative means may be employed to drive the rotatable ring. As illustrated in FIG. 7, a drive gear 50 is carried by the drive shaft 32. The teeth of the drive gear 50 mesh with corresponding teeth formed on the periphery of the rotatable ring As shown in FIG. 7 a drive pulley 52 is carried by the drive shaft 32 and is drivingly connected to the rotatable ring 42 by a drive belt 54.

The first deflector 22 and the second deflector 24 are mounted on the front surface 42a of the rotatable ring 42. The first deflector 22 and the second deflector 24 as illustrated are rectangular bodies, each having a non-reflective surface 56 and a reflective surface 58 which faces the reflective surface of the other deflector. The first deflector 22 is mounted on the rotatable ring 42 to lie in a plane that defines an angle of 45° with respect to the plane of the lens 19. The reflecting surface of the first deflector 22 faces the lens and the first deflector 22 is dimensioned to extend outwardly over the lens opening to screen the lens 19 The second deflector 24 is mounted on the rotatable ring 42 in diametric opposition to the first deflector 22 and lies in a plane parallel to that of the first deflector. The reflective surface 58 of the second deflector 24 faces the first deflector 22 and can be designed to tilt with the focus ring of the lens 19 to allow for parallax. It will be understood that prisms will serve as well as the first deflector 22 and the second deflector. However, in this embodiment it is preferred to use rectangular mirrors to reduce the bulk of the attachment.

Figure 5A:
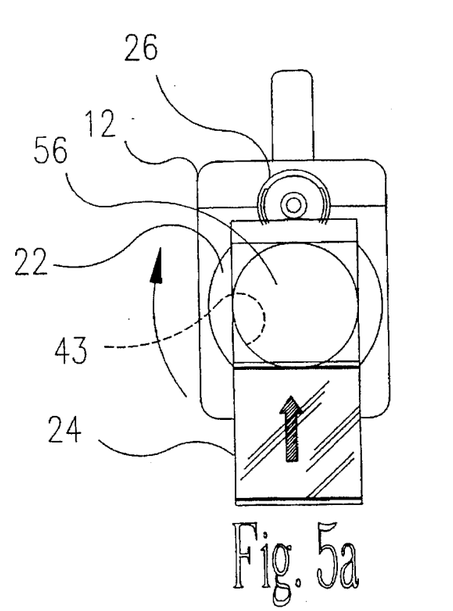
FIG. 5a through 5d is a front view showing the deflectors as having rotated about the optical path of the incoming image rays to another position and deflecting the image ray to the lens while keeping the image orientation upright through the 360 degrees of rotation.
Figure 5B:
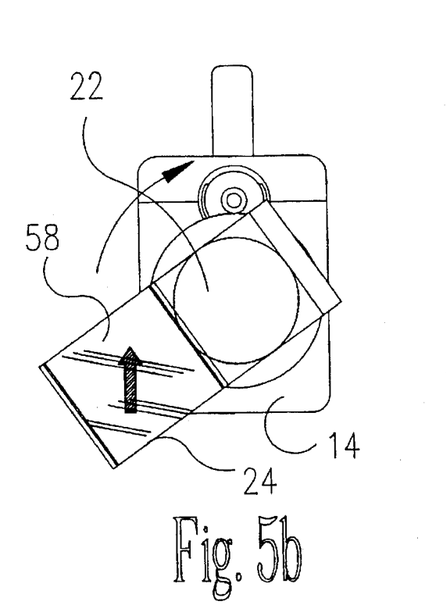
Figure 5C:
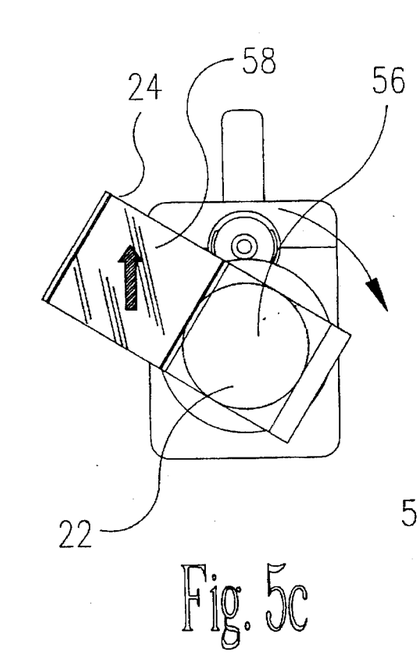
Figure 5D:
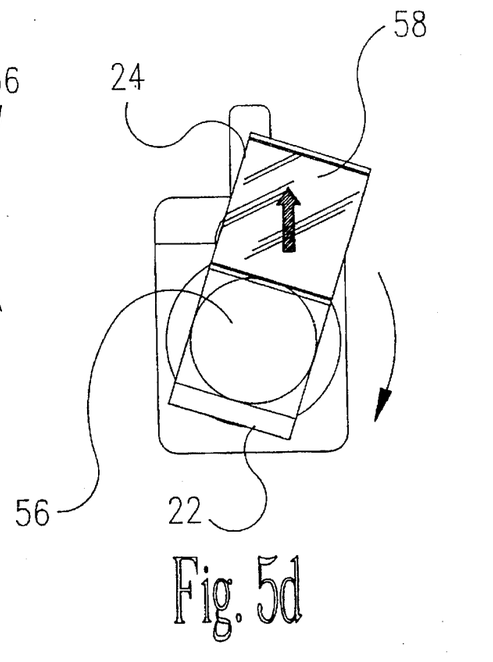

The rotating ring is caused to rotate slowly at a rate of less than 20 RPM, preferably at about 1 RPM carrying the first deflector 22 and the second deflector 24 about the optical path of the image rays. FIGS. 5a–5d illustrate the manner in which the first deflector 22 and the second deflector 22 rotate about the axis defined by the optical path of the image rays. As shown in FIG. 5a the first deflector 22 and the second deflector 24 are in a generally over-under relationship with respect to the horizontal plane. The image is first perceived on the reflective surface of the second deflector 24 where it reflected to the reflective surface of the first deflector 22 and then to the lens 19 of the camera. In FIG. 5c the first deflector 22 and the second deflector 24 have moved to a near side-by-side relationship with respect to the horizontal plane. The image perceived by the second deflector 24 is of a different perspective than that of FIG. 5a or 5b. As the rotatable ring 42 carries the first deflector 22 and the second deflector 24 around the axis of the optical path of the image rays at a frame rate of 30 frames per second, 1800 images of different perspectives are received by the sensing medium of the camera each minute. The effect of the first deflector 22 and the second deflector 24 is not apparent to the operator of the camera when focusing on a scene of medium distance even though the image is being reflected by the deflectors to the lens 19. The focusing and operational techniques normally employed with the particular camera being used can be employed with the attachment 20 of the present invention.

Figure 8:
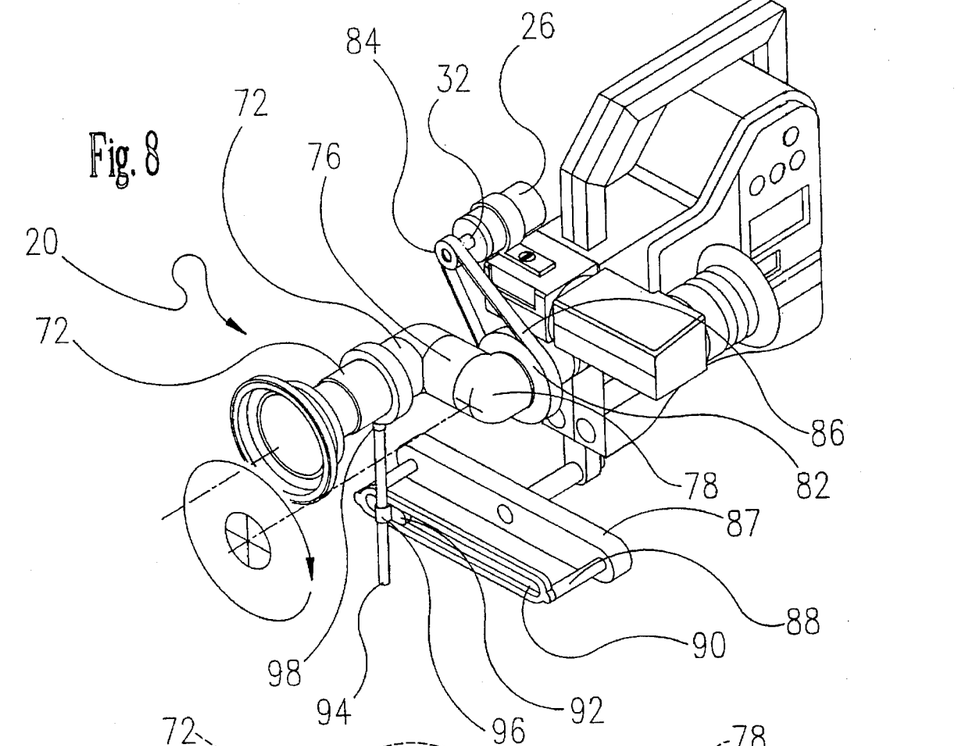
FIG. 8 is a perspective view of a camera employing another embodiment of the invention for recording stereoscopic scenes.

Referring to FIG. 8, there is illustrated another embodiment of the invention in which the deflectors are positioned in a crank shaped attachment 20 posteriorly of the lens 19. This embodiment of the invention can be used with short focal length lens as well as with lens having long focal lengths. The attachment 20 is designed to be mounted in a conventional camera body 12 in place of a conventional lens body.

The attachment 20 comprises a lens body 17 rotatably mounted on one end of a crank shaped deflector body 72 which defines a lens holder section 74 rotatably attached to a mid section 76 and a camera mount section 78 which is rotatably journaled in the camera body 12 in optical alignment with the sensing medium in the camera 10. The mid section 76 of the deflector body 72 extends at an angle of 90° from the longitudinal axes of the lens holder section 74 and the camera mount section 78 to form a path for the light as it is deflected from the lens 19 to the sensing medium in the camera body 12. A first prism deflector 82 is disposed in the deflector body 72 in optical alignment with a second deflector prism 80 and the sensing medium in the camera body 12. The second prism deflector 80 is disposed in the deflector body 72 in optical alignment with the lens 19 and the first prism deflector 82. It will be understood that mirrors can also be used to deflect the light rays in place of the prisms. Due to the extension of the lens 19 away from the sensing medium, i.e., recording chip or film strip, it is also understood that the lens 19 may consist of a matched set of lenses, preferably acromats, which are utilized to gain the required distance for extension of the lens 19 by converting the incoming rays from converging to parallel at the lens body 72 and back to converging at the opening 16 of the camera body 12.

The mid section 76 of the deflector body 72 is journaled in the front portion of the camera mount section 78 and a pulley 82 is formed on the mid section 78 in alignment with a driving pulley 84 fixed on the drive shaft 32 of the electric motor 26 mounted on the upper surface of the camera body 12 by the cradle 25. Rotation of the driving pulley is translated to the pulley 82 by a drive belt 86 to cause the deflector body 72 to rotate. The cradle 25 and motor 26 may be positioned on the side or bottom portions of the camera body 12 with equally good results.

To maintain control of focus and aperture adjustment while filming it is necessary that the orientation of the lens 19 be maintained. Accordingly the lens holder section 74 must rotate in relation to the deflector body 72 so as to maintain the orientation of the lens 19 fixed as the deflector body rotates. Referring to FIG. 7, a pair of arms 88 extend outwardly from a fixture 87 attached to the camera body 12 and terminate in alignment with the lens holder section 74 of the deflector body 72. The arms 88 carry at their extending ends a track 90 which is closed at the top, bottom and sides. A slider 92 is carried in the track 90 for transverse movement therein which is limited by the closed sides and top of the track. An upwardly extending rod 94 is carried by the slider 92 and its lower end extends through an opening in a boss 96 formed on one side surface of the slider, preferably the side facing away from the camera body 12, for reciprocal movement therein. The upper end of the rod 94 terminates at the lens holder section 74 and is attached thereto, such as by a member 98 formed on the lens holder section 74 having a threaded socket for receiving the threaded upper end of the rod.

Figure 9:
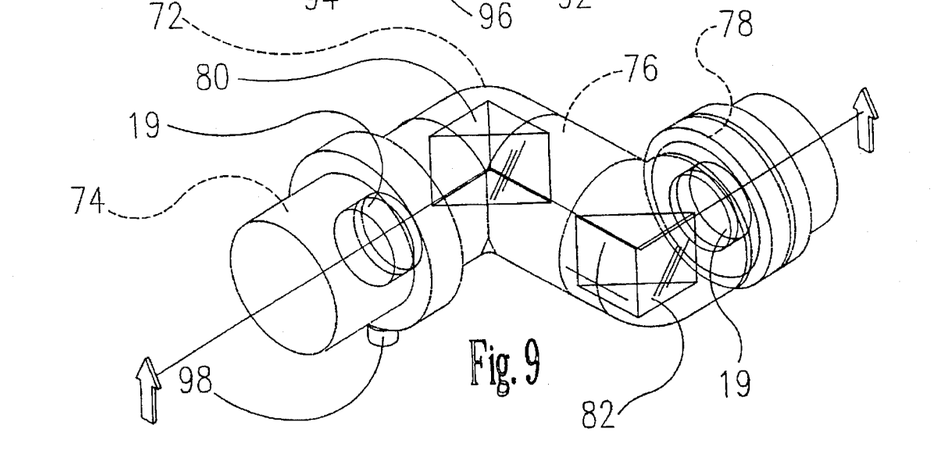
FIG. 9 is a ray trace diagrammatic illustration of the embodiment of the invention of FIG. 8 illustrating the manner in which the image ray is deflected in the lens body.

In operation, the deflector body 72 is driven by the electric motor 26 through the driving pulley 84, drive belt 86 and the pulley 82 to rotate about the longitudinal axis of the camera body 12. The lens holder section 74 rotates in relation to the deflector body by the reciprocal movement of the rod 94 and the transverse movement of the rod and slider 92. In this fashion the orientation of the lens 19 remains fixed during the rotation of the deflector body. As is most clearly illustrated in FIG. 9, light rays passing through the lens 19 are deflected by the second deflector prism to the second deflector 24 prism and then through the opening in the camera body 12 to the sensing medium. As the lens 19 is caused move in the path defined by the rotation of the deflector body the images being recorded have a continuously changing perspective. The deflector body 72 is rotated slowly, less than about 20 RPM and preferably between about 1 and 2 RPM. As described above when viewed through photopic-scotopic filters the images appear as stereoscopic images. When viewed as a conventional 2D with out the filters, the quality of the image is enhanced.

Having described the invention I claim:

1. Apparatus for producing apparent stereoscopic images, said apparatus being adapted for use in conjunction with a camera consisting of a camera body, a lens body and moving image sensing means, said apparatus comprising:

a. a lens body carrying at least one lens for receiving incoming image rays and defining a fixed orientation with respect to image sensing means of said camera;

b. a first and a second optical deflector, said second deflector disposed in an optical path defined by said incoming image rays for deflecting said image rays to said first optical deflector, said first deflector disposed in the path of said deflected image rays for further deflection of said image rays to said image sensing means of said camera body; and c. a mounting ring removably secured on said lens body, a rotatable ring having front surface, a rear surface and a center opening being rotatably mounted on said mounting ring, said rotatable ring carrying said first and said second optical deflector on said front surface thereof and further including means for rotating said rotatable ring thereby to cause said first and said second deflector to rotate about an axis defined by the optical path of incoming image rays.

2. The apparatus of claim 1 wherein said deflectors include reflective surfaces lying in parallel planes with respect to one another, said reflective surfaces being disposed at an angle to the optical path of incoming image rays, said deflectors being disposed in front of said lens, said reflective surface of said second deflector lying generally in the optical path of said incoming image rays to deflect said incoming image rays to said reflective surface of said first deflector, said reflective surface of said first deflector lying in the path of the deflected image rays for deflecting the image rays through said lens to the image sensing means in the camera body.

3. The apparatus of claim 1 wherein an annular track is defined about said lens mount, said rotatable ring is rotatably mounted on said mounting ring by guides rotatably carried on shafts extending from said rear surface of said rotatable ring and which travel in said annular track.

4. The apparatus of claim 3 wherein said means rotating said rotatable ring consists of a motor having a drive shaft on which is carried a drive mechanism adapted to transmit rotation of said drive shaft to said rotatable ring.

5. The apparatus of claim 1 wherein said first and said second optical deflectors are first surface mirrors.

6. The apparatus of claim 1 wherein said first and said second optical deflectors are prisms.

7. Apparatus for producing apparent stereoscopic images, said apparatus being adapted for use in conjunction with a moving image camera, said apparatus comprising a lens body adapted for connection to said camera, said lens body carrying at least one lens for receiving incoming image rays and defining a fixed orientation with respect to said image sensing means of said camera, said lens body comprising a body having a through running bore, said body defining a lens holder section, a mid section and a camera mount section having the bore thereof in optical alignment with said image sensing means of said camera, said mid section being rotatably journaled at one end in said camera mount section and at the opposite end in said lens holder section, the longitudinal axis of the bore of said mid section being disposed substantially perpendicularly to the longitudinal axis of the bores of said lens holder section and said camera mount section, a first optical deflector disposed in said lens body in optical alignment with a second optical deflector and with said image sensing means of said camera and said second optical deflector disposed in said lens body in optical alignment with said lens and with said first deflector, means for rotating said lens body in relation to said camera body and for rotating said lens holder section in relation to said lens body thereby rotating said first and said second optical deflectors about an axis defined by said optical path of said incoming image rays while maintaining said orientation of said lens fixed with respect to said image sensing means.

8. The apparatus of claim 7 further including a fixture attached to said camera body and including at least one extending arm having an extending end terminating in alignment with said lens holder section, said extending end carrying an track member having its longitudinal axis transverse to the axis of said lens holder section of said lens body, a slider is disposed in said track member for transverse reciprocal movement therein, an upwardly extending rod carried by the slider for vertical reciprocal movement is attached at its upper end to said lens holder section whereby said rod and said slider cooperate to prevent said lens holder section from rotating as said lens body rotates and the orientation of said lens remains fixed with respect to said sensing means in said camera body.

* * * * *